United States Patent
Georgin et al.

(10) Patent No.: US 12,122,347 B2
(45) Date of Patent: Oct. 22, 2024

(54) SYSTEM AND METHOD TO ADDRESS UNCOMMANDED BRAKE (UCB) APPLICATION AND BRAKE TEMPERATURE SENSING USING PRIMARY AND ALTERNATE ARCHITECTURE

(71) Applicant: Goodrich Corporation, Charlotte, NC (US)

(72) Inventors: Marc J. Georgin, Dayton, OH (US); Resham Bains, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 239 days.

(21) Appl. No.: 17/898,195

(22) Filed: Aug. 29, 2022

(65) Prior Publication Data
US 2024/0067145 A1 Feb. 29, 2024

(51) Int. Cl.
*B60T 8/88* (2006.01)
*B60T 8/17* (2006.01)
*B60T 8/171* (2006.01)
*B60T 8/92* (2006.01)

(52) U.S. Cl.
CPC ............ *B60T 8/885* (2013.01); *B60T 8/1703* (2013.01); *B60T 8/171* (2013.01); *B60T 8/92* (2013.01); *B60T 2270/402* (2013.01); *B60T 2270/413* (2013.01)

(58) Field of Classification Search
CPC .......... B60T 8/1703; B60T 8/171; B60T 8/92; B60T 8/325; B60T 8/885; B60T 17/221; B60T 2270/42; B60T 2270/413; B64C 25/42; B64C 25/44
See application file for complete search history.

(56) References Cited

U.S. PATENT DOCUMENTS

| | | |
|---|---|---|
| 5,845,975 A | 12/1998 | Wells |
| 6,296,325 B1 | 10/2001 | Corio et al. |
| 6,820,946 B2 | 11/2004 | Salamat et al. |
| 9,139,292 B2 | 9/2015 | Cahill |
| 9,656,641 B2 * | 5/2017 | Griffith ................ B60T 8/1703 |
| 11,204,285 B2 | 12/2021 | Bruggemann et al. |
| 11,364,884 B2 | 6/2022 | Georgin et al. |
| 2007/0235267 A1 | 10/2007 | Liebert |
| 2008/0149436 A1 | 6/2008 | Griffith et al. |

(Continued)

FOREIGN PATENT DOCUMENTS

EP 2094551 9/2009

OTHER PUBLICATIONS

European Patent Office, European Search Report dated Jan. 22, 2024 in Application No. 23189554.1.

*Primary Examiner* — George C Jin
(74) *Attorney, Agent, or Firm* — SNELL & WILMER L.L.P.

(57) ABSTRACT

A brake system and method of braking for an aircraft are provided. The brake system includes a primary brake control unit and an alternate brake control unit. In response to the primary brake control unit being placed in an active mode, the primary brake control unit is configured to send data on a set of channels to control brake operation of at least one brake, while the alternate brake control unit is configured to monitor brake temperature on another, separate set of channels coupled to at least one brake temperature sensor associated with the at least one brake.

20 Claims, 6 Drawing Sheets

(56) References Cited

U.S. PATENT DOCUMENTS

| | | | |
|---|---|---|---|
| 2018/0029567 A1* | 2/2018 | Cahill | B60T 17/221 |
| 2019/0263374 A1* | 8/2019 | Bill | B60T 8/325 |
| 2020/0172077 A1* | 6/2020 | Burte | F16D 66/00 |
| 2022/0144228 A1* | 5/2022 | Leiter | B60T 8/171 |
| 2023/0249846 A1* | 8/2023 | Georgin | B60T 13/662 |
| | | | 188/1.11 L |
| 2024/0001897 A1* | 1/2024 | Georgin | B60T 8/94 |
| 2024/0067145 A1* | 2/2024 | Georgin | B60T 8/92 |

* cited by examiner

SYSTEM AND METHOD TO ADDRESS UNCOMMANDED BRAKE (UCB) APPLICATION AND BRAKE TEMPERATURE SENSING USING PRIMARY AND ALTERNATE ARCHITECTURE

FIELD

The present disclosure generally relates to control applications for vehicles and more specifically to systems, and methods for aircraft brake control systems of at least an un-commanded brake application with brake temperature monitoring to one or more wheels during takeoff and landing.

BACKGROUND

Aircraft often include one or more landing gear that comprise one or more wheels. Each wheel may have a brake that is operatively coupled to the wheel to slow the wheel, and hence the aircraft, during, for example, landing or a rejected takeoff. Aircraft may employ hydraulic or electro-mechanical braking systems. Some aircraft brake systems adjust the compression of friction disks by controlling a servo valve to adjust the pressure of a hydraulic actuator. Other aircraft brake systems adjust the compression of the friction disks by controlling electro-mechanical actuators. Aircraft brake control systems receive input signal(s) indicating a desired braking force or braking torque and may transmit a signal to a brake controller. The signal may direct a brake actuator or brake valve to produce a braking force/torque. However, a brake control system may malfunction, and can result in un-commanded brake application actuated to one or more wheels during takeoff or landing. It is desirable to safeguard and reduce instances of un-intended command actions of brake application to one or more wheels of the aircraft when take-off power is applied to the engines of the aircraft.

SUMMARY

In various embodiments, a brake system is described. The brake system includes a primary brake control unit; and an alternate brake control unit; in response to the primary brake control unit placed in an active mode, the primary brake control unit is configured to separately send data on a set of channels to control brake operation of at least one outboard brake and at least one inboard brake while the alternate brake control unit is configured to receive data during the brake operation to monitor brake temperature on another set of channels coupled to a plurality of brake temperature sensors associated with the at least one outboard brake and the at least one inboard brake.

In various embodiments, the data on the set of channels to control brake operation and the data to monitor brake temperature are separately sent and received on different channels by the primary brake control unit and the alternate brake control unit.

In various embodiments, the brake system further includes in response to the alternate brake control unit placed in the active mode, the alternate brake control unit is configured to separately send data on the set of channels to control brake operation of at least one outboard brake while configured to monitor brake temperature on another set of channels coupled to the plurality of brake temperature sensors associated with at least one outboard brake and the at least one inboard brake.

In various embodiments, the primary brake control unit is configured for takeoff of an aircraft in the active mode to send data on the set of channels to the outboard brake while the alternate brake control unit is configured in the takeoff of the aircraft in a standby mode to receive data separately on another set of channels to monitor temperature of at least the outboard brake and the inboard brake during the takeoff of the aircraft.

In various embodiments, the alternate brake control unit is configured for landing of the aircraft in the active mode to send data on the set of channels to the outboard brake and to receive data separately on another set of channels to monitor the temperature of at least the outboard brake and the inboard brake during the landing of the aircraft.

In various embodiments, the primary brake control unit and the alternate brake control unit are configured to switch back and forth between the active mode for a plurality of aircraft operations to control the brake operation with alternate brake control unit configured to monitor the brake temperature.

In various embodiments, the primary brake control unit is configured to function independent of the alternate brake control unit during the takeoff of the aircraft to prevent a common failure from occurring in the primary brake control unit and the alternate brake control unit resulting in an un-commanded brake control action on at least one wheel of the aircraft during the takeoff and loss of brake temperature monitoring on at least one wheel of the aircraft during the takeoff.

In various embodiments, a brake system is provided. The brake system includes at least one inboard brake; at least one outboard brake; a plurality of brake temperature sensors; a primary brake control unit; and an alternate brake control unit; wherein the primary brake control unit is configured in a first mode, to separately send data on a set of channels to control brake operation of at least one outboard brake and at least one an inboard brake while the alternate brake control unit is configured, in a second mode, to receive data during the brake operation to monitor brake temperature on a different set of channels coupled to the plurality of brake temperature sensors associated with at least one outboard brake and the at least one inboard brake.

In various embodiments, the data on the set of channels to control brake operation and the data to monitor brake temperature is sent and received on a plurality of channels to segregate control and monitor functions between the primary brake control unit and the alternate brake control unit in controlling the brake operation and monitoring the brake temperature.

In various embodiments, the alternate brake control unit is configured in the first mode to send data on the set of channels to control brake operation of the at least one outboard brake and at least one inboard brake and to monitor brake temperature on the different set of channels coupled to the plurality of brake temperature sensors associated with at least one outboard brake and at least one inboard brake.

In various embodiments, the primary brake control unit and the alternate brake control unit are configured vice versa in either the first mode or the second mode to send data on the set of channels to control brake operation of at least one outboard brake and at least one an inboard brake, while the alternate brake control unit is configured to monitor brake temperature on the different set of channels coupled to the plurality of brake temperature sensors associated with at least one outboard brake and at least one inboard brake.

In various embodiments, the primary brake control unit is configured for a takeoff flight phase in the first mode to send data on the set of channels to the outboard brake and the inboard brake while the alternate brake control unit is configured in the takeoff flight phase in the second mode to receive data separately on the different set of channels to monitor the temperature of at least the outboard brake and the inboard brake during the takeoff flight phase.

In various embodiments, the alternate brake control unit is configured for a landing flight phase in the first mode to send data on the set of channels to the outboard brake and the inboard brake and to monitor the temperature of at least the outboard brake and the inboard brake during the landing flight phase.

In various embodiments, the primary brake control unit and the alternate brake control unit are configured to alternate between the first mode and the second mode for a plurality of aircraft operations to independently perform functions of controlling the brake operation while the alternate brake control unit is configured for monitoring the brake temperature.

In various embodiments, the primary brake control unit is configured to function independent of the function of the alternate brake control unit during multiple flight phases to control brake operation and to prevent a common failure from occurring in the primary brake control unit and the alternate brake control unit resulting in an un-commanded brake control action on at least one wheel of an aircraft during takeoff and loss of brake temperature monitoring on at least one wheel of the aircraft during the takeoff.

In various embodiments, the multiple flight phases comprise at least a taxi operation, a takeoff operation, and a landing operation of the aircraft.

In various embodiments, a method of controlling a brake system is provided. The method includes receiving a first status for a primary brake control unit; receiving a second status for an alternate brake control unit wherein the second status is dependent on the first status; determining whether the primary brake control unit based on the first status is configured in a state to perform functions of controlling brake operations; determining whether the alternate brake control unit based on the second status is configured in another state to perform functions of controlling brake operations with a function of monitoring brake temperatures; and activating the primary brake control unit, and the alternate brake control unit in either state to segregate performing of the functions of the primary brake control unit and the alternate brake control unit for controlling brake operations with the alternate brake control unit performing the function of monitoring brake temperatures.

In various embodiments, segregating of the functions prevents propagating of a failure mode between both the primary brake control unit and the alternate brake control unit resulting in an un-commanded brake control action on at least one wheel of an aircraft during a takeoff and loss of brake temperature monitoring on the at least one wheel of the aircraft during the takeoff.

In various embodiments, the first status comprises at least a takeoff status of the aircraft.

In various embodiments, the first status comprises at least a landing status of the aircraft.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
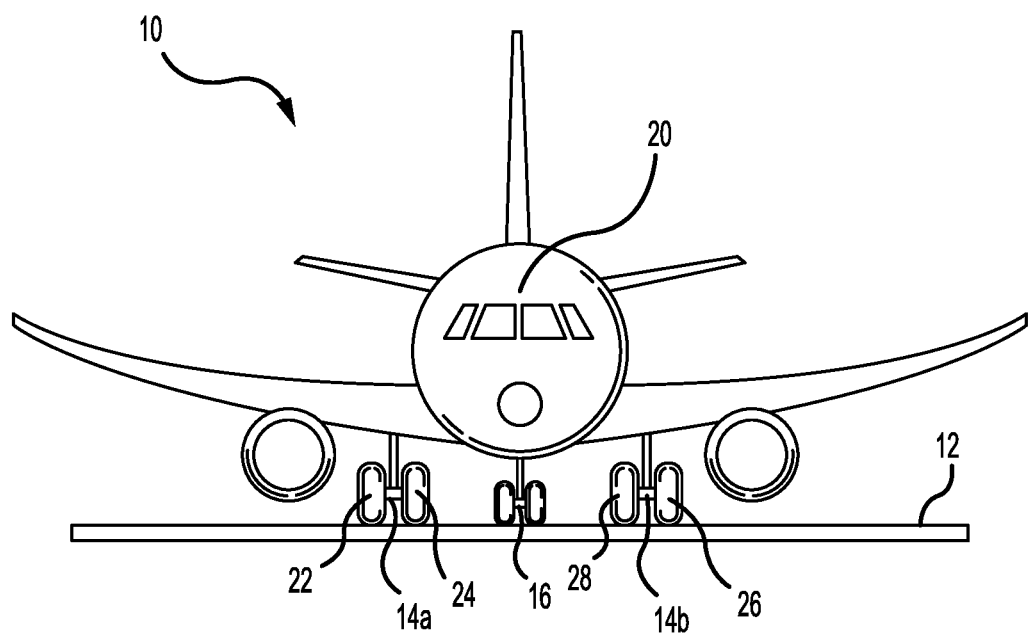
FIG. 1 illustrates a diagram of an aircraft on a runway with landing gear of a plurality of wheels in accordance with various embodiments.

The following detailed description of various embodiments herein refers to the drawings, which show various embodiments by way of illustration. While these various embodiments are described in sufficient detail to enable those skilled in the art to practice the disclosure, it should be understood that other embodiments may be realized and that changes may be made without departing from the disclosure. Thus, the detailed description herein is presented for illustration only and not of limitation. Any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed may be combined.

As used herein, a first component that is "radially outward" of a second component means that the first component is positioned at a greater distance away from a common axis (e.g., a rotational axis of a wheel assembly) than the second component. A first component that is "radially inward" of a second component means that the first component is positioned closer to the common axis than the second component. In the case of components that rotate about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Aircraft architecture is functionally interdependent and is a system-of-systems configuration where systems interact with each other and are dependent upon each another to perform operations. In electric brakes, a brake controller (or controller) is coupled to one or more electromechanical actuator controllers (EMACs) for a brake, which drives one or more electromechanical brake actuators. The brake controller may be in communication with a brake pedal, and thus may control the EMACs in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

In various embodiments, a brake control system is configured with a primary and alternate architecture which are two independently operated brake systems. Both systems functions in opposite modes, when one system is active, for example the primary system, the alternate system is in stand-by mode (or inactive). If the primary system suddenly fails, then braking responsibility transfers to the alternate system.

In various embodiments, the main brake control function is segregated from the Brake Temperature Monitoring (BTM) function in order to prevent an un-commanded brake action to one or more wheels during takeoff or the un-commanded brake action initiated in combination with a loss of brake temperature monitoring that can occur based upon various common failure modes or a single development error in the system.

Referring to FIG. 1, FIG. 1 illustrates a diagram of an aircraft 10 on a runway 12 with landing gear of a plurality of wheels in accordance with various embodiments. The aircraft 10 may comprise right landing gear 14a, left landing gear 14b, and nose landing gear 16. The nose landing gear 16 is located under the nose of aircraft 10 and may not include a brake. Each landing gear is illustrated in FIG. 1, for example, as having two wheels. For example, right landing gear 14a may comprise a plurality of wheels, such as a right outboard (ROB) wheel 22 and a right inboard (RIB) wheel 24. Left landing gear 14b may comprise a plurality of wheels, such as a left outboard (LOB) wheel 26 and a left inboard (LIB) wheel 28. In various embodiments, aircraft 10 may comprise any number of landing gears and each landing gear may comprise any number of wheels. The landing gear supports the aircraft 10 when it is not flying, allowing the aircraft 10 to taxi, takeoff, and land without incurring damage. While the disclosure refers to a single landing gear configuration, the disclosure should not be construed as limited to this configuration and contemplates any number or multiple landing gear configurations.

In various embodiments, various critical safety objectives are accomplished by brake control systems configured with the landing gear of the aircraft 10 and include multiple scenarios (deemed catastrophic) of the total loss of braking operation by the aircraft brakes, un-commanded brake application on at least two wheels during takeoff, and the un-commanded brake application on one or more wheels during takeoff/landing combined with a loss of brake temperature monitoring.

In various embodiments, the brake control system is configured to comply with various safety requirements, for example those defined in by the U.S. Federal Aviation Administration Advisory Circular ("AC")/AMJ 25.1309 ARSENAL version. The Section 25.1309(b) provides requirements for a (logical and acceptable inverse) relationship between the probability and the severity of certain failure conditions. In various embodiments, SAE International's SAE ARP4761 for compliance maintains the main brake control function shall be segregated from the Parking Brake function up to the brake shuttle valves interface in order to reduce the common modes which may cause total loss of brakes; segregated from the Nose Wheel Steering Control function in order to prevent that any common mode may result in loss of directional control on ground; segregated from the Landing Gear Control function in order to prevent that any common mode may result in loss or erroneous wheel speed and air/ground data, and segregated from the Brake Temperature Monitoring function in order to prevent that a common failure mode or single development error may result in un-commanded brake application on any wheel during takeoff combined with loss of brake temperature monitoring.

Figure 2:
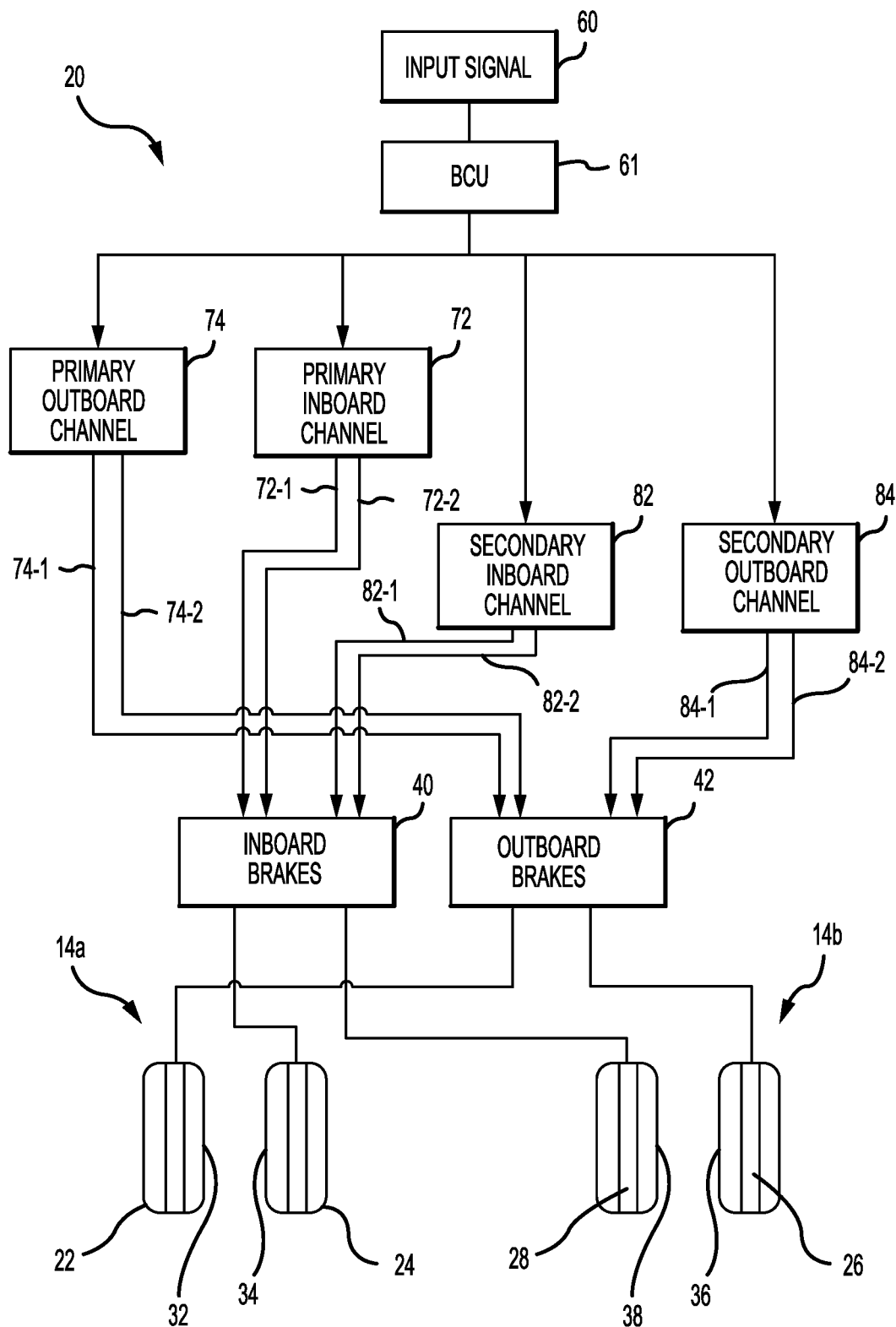
FIG. 2 illustrates a brake control system for inboard and outboard brakes in accordance with various embodiments.

Referring to FIGS. 1 and 2, the aircraft 10 may include a brake system 20, which may be applied to any wheel of the landing gear. The brake system 20 may comprise a brake control system of aircraft 10. The brake system 20 of aircraft 10 may be a collection of subsystems that produce output signals for controlling the braking force and/or torque applied to each of wheels 22, 24, 26, 28. The brake system 20 may communicate with the brakes of the right landing gear 14a and the left landing gear 14b. The right landing gear 14 a may include a ROB brake 32 and a RIB brake 34 coupled to ROB wheel 22 and RIB wheel 24, respectively. ROB brake 32 and RIB brake 34 may be mounted to ROB wheel 22 and RIB wheel 24, respectively, to apply and release braking force on each respective wheel. The left landing gear 14b may include an LOB brake 36 and a LIB brake 38 coupled to LOB wheel 26 and LIB wheel 28, respectively. LOB brake 36 and LIB brake 38 may be mounted to LOB wheel 26 and LIB wheel 28, respectively, to apply and release braking force on each respective wheel. The RIB brake 34 and LIB brake 38 may be referred to, collectively, as inboard brakes 40. The ROB brake 32 and LOB brake 36 may be referred to, collectively, as outboard brakes 42.

Referring to FIG. 2, the brake system 20 is shown schematically having architecture in accordance with various embodiments. The brake system 20 may include at least one upper-level controller, or brake control unit (BCU) 61, for providing overall control of the braking system. In various embodiments, as described below, BCU 61 comprises a primary BCU and an alternate BCU. The BCU 61 may interpret input commands or input signals 60 from the aircraft cockpit controls and avionics and may issue braking force commands to inboard brakes 40 and outboard brakes 42. In various embodiments, the brake system 20 may include a primary inboard (PIB) channel 72, a primary outboard (POB) channel 74, an alternate inboard (SIB) channel 82 and an alternate outboard (SOB) channel 84.

Each of the PIB channel 72 and SIB channel 82 may be coupled to or in electrical communication with the inboard brakes 40. The inboard brakes 40 may be configured to receive a command through either of PIB channel 72 or SIB channel 82, such that inboard brakes 40 may be controlled by PIB channel 72 or SIB channel 82. Each of POB channel 74 and SOB channel 84 may be coupled to or in electrical communication with outboard brakes 42. The outboard brakes 42 may be configured to receive a command through either of POB channel 74 or SOB channel 84, such that outboard brakes 42 may be controlled by POB channel 74 or SOB channel 84.

The PM channel 72 may further include dual redundant communication channels. For example, PIB channel 72 may include a first PIB channel 72-1 and a second PIB channel 72-2. POB channel 74 may further include dual redundant communication channels, such that POB channel 74 includes a first POB channel 74-1 and a second POB channel 74-2. SIB channel 82 may further include dual redundant communication channels, such that SIB channel 82 includes a first SIB channel 82-1 and a second SIB channel 82-2. SOB channel 84 may further include dual redundant communication channels, such that SOB channel 84 includes a first SOB channel 84-1 and a second SOB channel 84-2.

Figure 3:
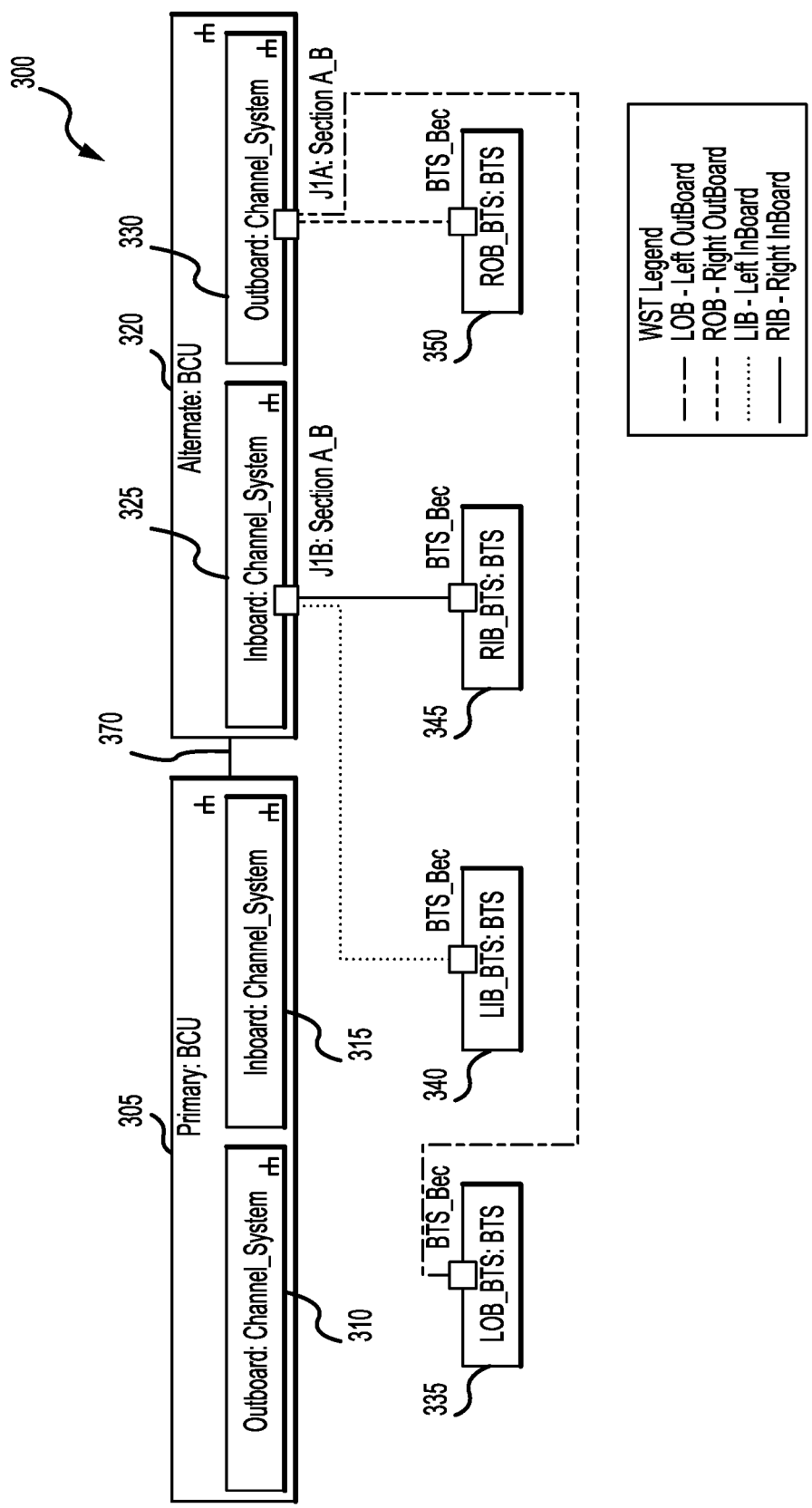
FIG. 3 illustrates a schematic diagram of an aircraft braking system and a brake temperature monitoring system in accordance with various embodiments.

Referring to FIG. 3, FIG. 3 illustrates a diagram of the brake control system and brake temperature system control architecture for segregated monitoring by the alternate brake control unit which functions separately from the primary brake control unit to monitor the brake temperature of the inboard and outboard brakes of the aircraft in accordance with various embodiments. In FIG. 3, the control diagram 300 illustrates a state in which the primary brake control unit (BCU) 305 is siloed off or segregated from the alternate brake control unit (BCU) 320. The primary BCU 305 is configured with multiple channels of an outboard channel system 310 and an inboard channel system 315 for controlling the brake operations of the inboard and outboard brake sets. In that regard, in various embodiments, primary BCU 305 is in electronic communication with POB channel 74 and PIB channel 72 while alternate BCU 320 is in electronic communication with SOB channel 84 and SIB channel 82, with momentary reference to FIG. 2.

In an active mode when the aircraft is in a takeoff operational state such as when takeoff power is being applied to the engines or during a taxing operation for takeoff, the primary BCU 305 is configured to control the inboard and outboard brake sets while the alternate BCU 320 is configured to monitor the inboard and outboard brake set temperatures. Thus, the primary BCU 305 is in an active state and the alternate BCU 320 is in a standby state. In various embodiments, the alternate BCU 320 is configured with an inboard channel system 325 and an outboard channel system 330. The inboard channel system 325 is coupled to brake temperature sensors in separate channels to a left inboard (LIB) brake temperature sensor 340 and on another channel to the right inboard (RIB) brake temperature sensor 345. The outboard channel system 330 is similarly coupled on separate channels to the right outboard (ROB) brake temperature sensor (BTS) 350 and the left outboard (LOB) brake temperature sensor (BTS) 335. The alternate BCU 320 in this standby state, with the primary BCU 305 in an active state, receives temperature data from multiple brake temperature sensors associated with sets of inboard and outboard brake sets, e.g., LIB sensor 340, RIB sensor 345, ROB sensor 350, and/or LOB sensor 335. To avoid latent failures in each system, the primary and alternate braking systems are alternated in the landing phase. For example, in the takeoff flight phase, the primary BCU 305 is placed in an active state to control the brake operation, and the alternate BCU 320 is placed in the standby state (or another state) to monitor the temperature of the brakes during the active brake operations. In contrast, whether the primary BCU 305 or the alternate BCU 320 is in the active state during a landing phase is determined by which of the primary BCU 305 or the alternate BCU 320 was in the active state during the prior landing of the aircraft. For instance, if the primary BCU 305 was in the active state during the previous landing of the aircraft, in the next landing phase, the alternate BCU 320 is placed in the active state to control brake operations and to monitor brake temperatures while the primary BCU 305 is placed in the standby. Similarly, if the alternate BCU 320 was in the active state during the previous landing of the aircraft, in the next landing phase, the primary BCU 305 is placed in the active state to control brake operations. Thus, the alternating of active control between the primary BCU 305 and the alternate BCU 320 is determined based on which unit was active during the prior landing of the aircraft.

In various embodiments, the primary BCU 305 is always kept in an active state during the takeoff flight phase to control brake operation while the alternate BCU 320 is kept in a different state (e.g., the standby state or mode) to monitor temperature of the inboard and outboard brakes and to receive temperature data from the braking temperature sensors associated with each of the brake units (i.e., the inboard and outboard brake sets). In various embodiments, the primary BCU 305 is kept in the active state during the takeoff phase unless the primary BCU 305 fails during the takeoff phase, in which case, the alternate BCU 320 is changed to the active state and becomes the active braking system (and performs both the braking control and temperature monitoring). This configuration of the primary BCU 305 and the alternate BCU 320 provides separation between each braking system and enables each braking system to function independently in the tasks assigned for brake control with the alternate BCU 320 always performing the brake temperature monitoring.

In various embodiments, the segregated channel architecture enables both braking systems, the primary and alternate braking systems to meet the safety requirements of a brake control system that separates (or requires segregation) the brake temperature monitoring system during the takeoff phase of the aircraft operation from the braking control operation.

In various embodiments, the separate channel configuration of the primary and alternate brake control units prevents common fault propagation between both braking systems and the un-commanded brake application on at least one wheel (i.e., any wheel) of the aircraft during takeoff/landing combined with a loss of brake temperature monitoring without the need to have a separate brake temperature monitoring system. Specifically, the alternate BCU 320 provides the brake temperature monitoring system separate from the active braking system during the takeoff phase of the aircraft operation (i.e., the alternate BCU 320 is a separate system for temperature monitoring and the stand-by braking system) while the primary BCU 305 is the active braking system during the takeoff phase of the aircraft operation.

In various embodiments, the active braking controller (i.e., the primary BCU 305) and the brake temperature monitoring system (i.e., the alternate BCU 320) communicate between each other to resolve status conflicts (i.e., the BCUs communicate via digital communications and resolve through the communications the proper status of each other). This communication link is represented by electronic communication line 370, which may comprise one or more wired or wireless interfaces with allow BCU 305 and BCU 320 to be in logical communication. If the primary BCU 305 fails as a result of at least one failure, the alternate BCU 320 will become active because it is standing by in a fully functional state.

In various embodiments, the brake temperature sensors (i.e., the right outboard (ROB) brake temperature sensor (BTS) 350 and the left outboard (LOB) brake temperature sensor (BTS) 335) comprise an assembly of k-thermocouple sensors which are wired to or otherwise coupled with the alternate BCU 320 which acts as a monitoring system for brake temperature during a takeoff and also in case of a rejected takeoff (RTO) event or other similar event. In various embodiments, by default, the primary BCU 305 is in an active state, and the brake temperature sensors are configured in a single channel operation to be connected to the alternate braking systems, i.e., alternate BCU 320. As discussed above, in various embodiments, during the landing flight phases, the primary BCU0 305 and alternate BCU 320 alternate between braking control, with the alternate braking system always performing temperature monitoring. This alternating between the primary BCU 305 and alternate BCU 320 is done to minimize latent failures during the landing phase of the aircraft as, if one of the BCUs 305 and 320 were to fail, the other would take control in this alternating configuration. In various embodiments, the primary BCU 305 and alternate BCU 320 will determine based on the previous landing which brake system should be active during a current landing, the primary braking system or the alternate braking. In various embodiments, the use of primary BCU 305 and alternate BCU 320 described herein provides for independent operation of the primary and alternate systems, which serves to prevent loss of more than one braking system due to a single failure in braking system.

In various embodiments, during an approach flight phase, the primary BCU 305 and alternate BCU 320 determine, based on a landing history of the aircraft, which brake system should be active, the primary BCU 305 or the alternate BCU 320. If the alternate BCU 320 is the active system during landing (i.e., the system to actively control brake functions), the alternate BCU 320 is still configured and coupled to the brake temperature sensors 335, 340, 345, and 350 providing temperature data.

Figure 4A:
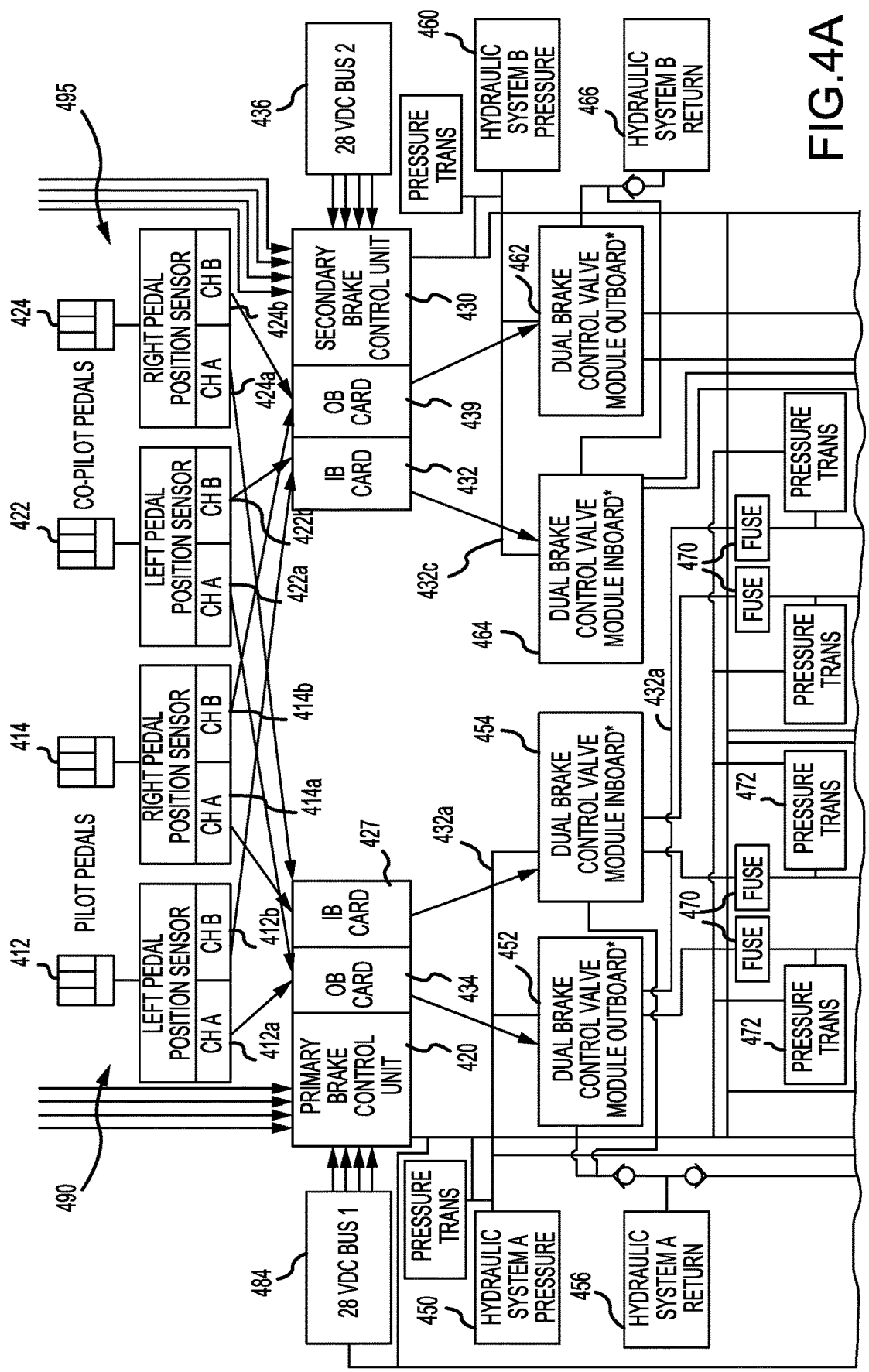
FIGS. 4A and 4B illustrate diagrams of an aircraft braking system in conjunction with a primary and alternate braking system in accordance with various embodiments.
Figure 4B:
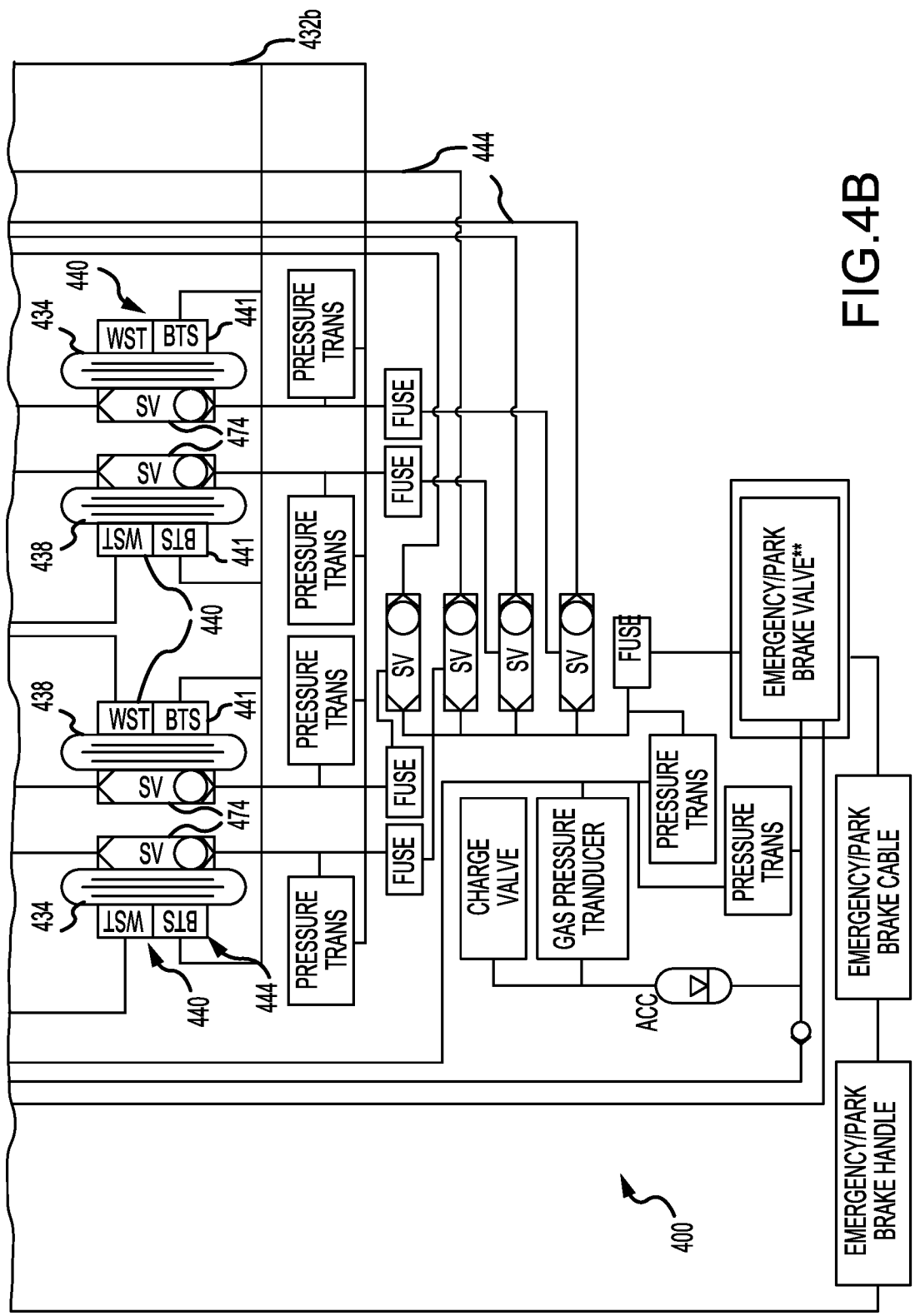

Referring now to FIGS. 4A and 4B, an aircraft braking system 400 is illustrated in conjunction with an outboard wheel 434 and an inboard wheel 438 on each of a port side and a starboard side of an aircraft. A separate brake 440 is provided for each of the outboard wheels 434 and the inboard wheels 438. A hydraulic system pressure source A 450 is fluidly connected with an outboard dual brake control valve module 452, which is in turn fluidly connected with the brake 440 for each of the outboard wheels 434 and an inboard dual brake control valve module 454, which is in turn fluidly connected with the brake 440 for each of the inboard wheels 438. The aircraft braking system 400 further includes a hydraulic system A return 456. Similarly, a hydraulic system pressure source B 460 is fluidly connected with an outboard dual brake control valve module 462, which is in turn fluidly connected with the brake 440 for each of the outboard wheels 434 and an inboard dual brake control valve module 464 which is in turn fluidly connected with the brake 440 for each of the inboard wheels 438. The aircraft braking system 400 further includes a hydraulic system B return 466. The aircraft braking system further includes a plurality of hydraulic fuses 470, pressure transducers 472, shuttle valves 474, a 28 VDC (DC voltage) bus" 484, and a 28 VDC bus" 436.

The above-noted brake control valve modules 452, 454, 462, 464 may each utilize one or more servo valves, one or more shut-off valves, or the like. The brake control valve modules 452, 454, 462, 464 are disposed in the flow path of their corresponding hydraulic system pressure source 450, 460. The shuttle valve(s) for each of the outboard dual brake control valve module 452 and the inboard dual brake control valve module 454 is disposed downstream of its corresponding servo valve(s) and the corresponding brake 440. Similarly, the shuttle valve(s) for each of the outboard dual brake control valve module 462 and the inboard dual brake control valve module 464 is disposed downstream of its corresponding servo valve(s) and the corresponding brake 440.

The aircraft braking system 400 of FIGS. 4A-B further includes a first or pilot pedal pair 490 and a second/co-pilot pedal pair 495. The first pedal pair 490 includes a first (e.g., left) pedal 412 and a second (e.g., right) pedal 414. A first pedal position sensor 412a and a second pedal position sensor 412b monitor the position of the first pedal 412 (e.g., displacement of the first pedal 412). Similarly, a first pedal position sensor 414a and a second pedal position sensor 414b monitor the position of the second pedal 414 (e.g., displacement of the second pedal 414). The second pedal pair 495 includes a first (e.g., left) pedal 422 and a second (e.g., right) pedal 424. A first pedal position sensor 422a and a second pedal position sensor 422b monitor the position of the first pedal 422 (e.g., displacement of the first pedal 422). Similarly, a first pedal position sensor 424a and a second pedal position sensor 424b monitor the position of the second pedal 424 (e.g., displacement of the second pedal 424). Each of the pedal position sensors 412a, 412b, 414a, 414b, 422a, 422b, and 424a, 424b may be in the form of a linear variable differential transformer (LVDT).

The aircraft braking system 400 utilizes both a first (e.g., primary) brake control unit (BCU) 420 and a second (e.g., alternate, or alternate) BCU 430. The first BCU 420 and second BCU 430 may be substantially similar to the primary BCU 305 and alternate BCU 320 discussed above in connection with FIG. 3. The first BCU 420 includes an inboard brake control card (BCC) 427 and an outboard BCC 439. Similarly, the second BCU 430 includes an inboard BCC 432 and an outboard BCC 439. FIGS. 4A-B illustrate: 1) an output of the first pedal position sensor 412a for the first pedal 412 (first pedal pair 410) is provided to the outboard BCC 434 of the first BCU 420; 2) an output of the second pedal position sensor 412b for the first pedal 412 (first pedal pair 410) is provided to the inboard BCC 432 of the second BCU 430; 3) an output of the first pedal position sensor 414a for the second pedal 414 (first pedal pair 410) is provided to the inboard BCC 427 of the first BCU 420; 4) an output of the second pedal position sensor 414b for the second pedal 414 (first pedal pair 410) is provided to the outboard BCC 434 of the second BCU 430; 5) an output of the first pedal position sensor 422a for the first pedal 422 (second pedal pair 495) is provided to the outboard BCC 439 of the first BCU 420; 6) an output of the second pedal position sensor 422b for the first pedal 422 (second pedal pair 495) is provided to the inboard BCC 432 of the second BCU 430; 7) an output of the first pedal position sensor 424a for the second pedal 424 (second pedal pair 495) is provided to the inboard BCC 427 of the first BCU 420; and 8) an output of the second pedal position sensor 424b for the second pedal 424 (second pedal pair 495) is provided to the outboard BCC 439 of the second BCU 430.

In various embodiments, the first and second BCU 420, 430 may comprise various components to aid in selecting an inboard or outboard brake for a respective landing gear and determining a brake pressure to supply to the respective brake.

For example, the first and second BCU 420, 430 may each comprise a computing device (e.g., a processor) and an associated memory. The processor may comprise any suitable processor, such as, for example, a general-purpose processor, a digital signal processor (DSP), an application specific integrated circuit (ASIC), a field programmable gate array (FPGA) or other programmable logic device, discrete gate or transistor logic, discrete hardware components, or any combination thereof. The memory may comprise an article of manufacture including a tangible, non-transitory computer-readable storage medium having instructions stored thereon that, in response to execution by the computing device (e.g., processor), cause the computing device to perform various methods, as discussed further herein.

The first (primary) BCU 420 is coupled to the channel network 432a to control operation of the brakes via brake control valve modules for the inboard and outboard brakes. The second (alternate) BCU 430 is coupled via the channel network 432b to the plurality of brake temperature sensors 441 to monitor the brake temperatures of the sets of inboard and outboard brakes (i.e., brakes 440).

The channel network 432b provides temperature data to the second BCU 430 to monitor brake 440 temperatures during control and operation of the brakes by the first BCU 420. Therefore, each braking control unit, i.e., the first BCU 420 and the second BCU 430, is functioning independently with the dual channel architecture described above in order to segregate or separate control of the brakes 440 and monitoring of the brake temperatures (via brake temperature sensors 441) that communicated and send/receive data on different pathways. In various embodiments, due to the above-described segregated architecture, the first (primary) BCU 420, when takeoff power is applied to the throttle, is configured to be in an active mode controlling braking, while the second (alternate) BCU 430 is configured to be in a different mode (i.e., non-active mode, such as a standby mode) to monitor brake temperatures. In various embodiments, during landing, brake control is alternated between the first (primary) BCU 420 and the second (alternate) BCU 430 in substantially the same manner as with the primary BCU 305 and alternate BCU 320 as discussed above. To facilitate this, during landing, the shuttle valve operation may be switched over (via the channel network 444 coupled to the alternate system) to put the second BCU 430 in an active mode to control brake operation via the channel network 432c, while placing the first BCU 420 in a standby mode. The channel network 444 are hydraulic lines and are not directly connected to the BCU 430. Instead, the channel network 444 is in fluid communication with various valves, wherein the valves comprise actuators that are capable of being commanded from an open position, to a closed position and to positions therebetween by at least of BCU 420 and BCU 430. The switching back and forth between the primary and alternate (secondary) control system prevents latent defects from occurring in either system, and a cycling back and forth process can be configured in landing between each control system.

Figure 5:
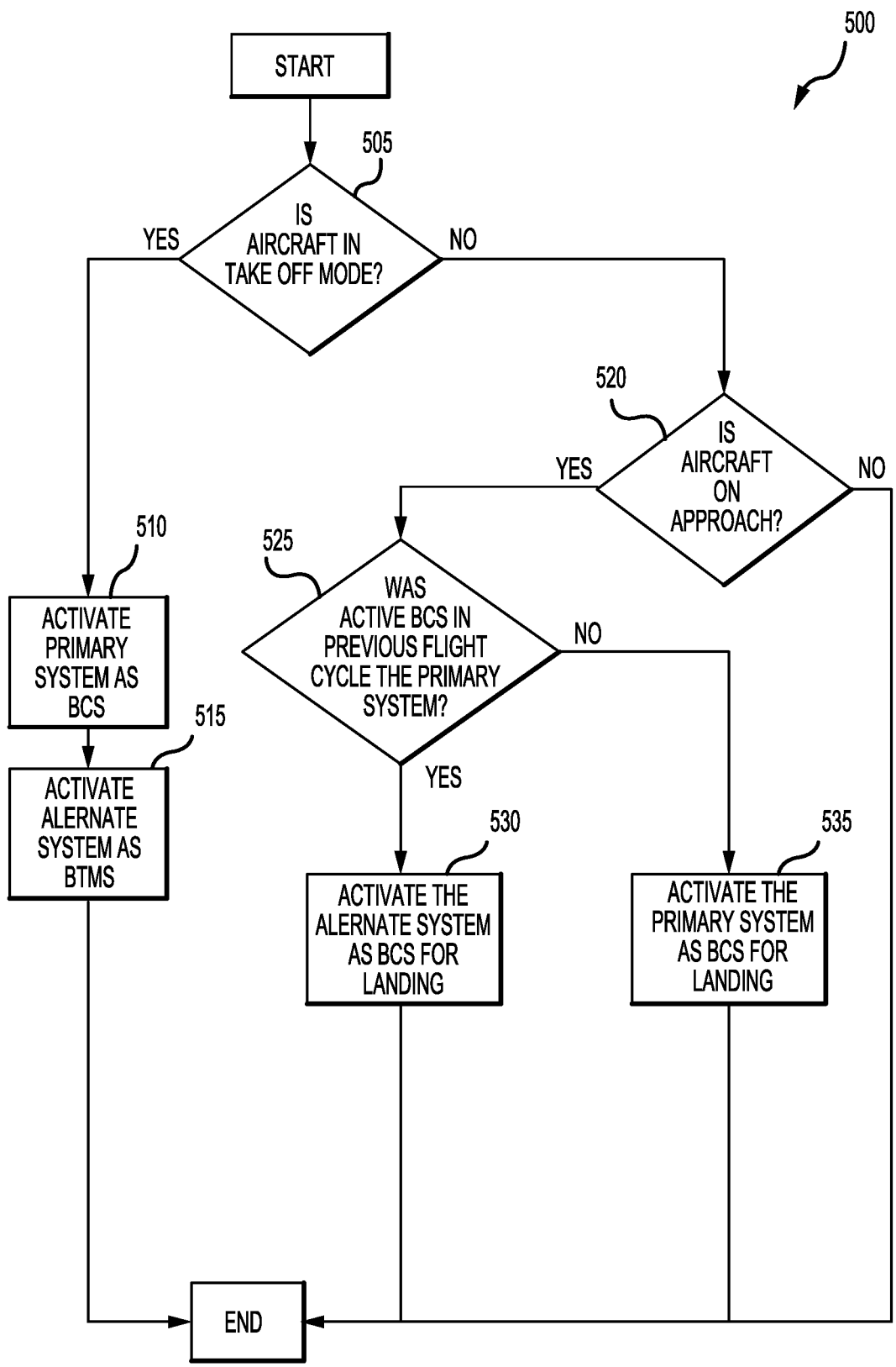
FIG. 5 illustrates a flow diagram of a method of controlling an aircraft braking system in accordance with various embodiments.

FIG. 5 illustrates a flow diagram of the switching between the primary and alternate brake control units 420, 430 in the landing mode of a flight in accordance with various embodiments. In FIG. 5, in the flow diagram 500, initially after actuation of the system, an evaluation is made at step 505 to determine if the aircraft is operating in a takeoff flight phase. This evaluation is made in order to configure the primary and alternate brake control units 420, 430 for operation consistent with takeoff mode settings. If the evaluation determines that the aircraft is in take off mode, at step 510, the primary system, i.e., the first (primary) BCU 420 is activated with functionality and channel configuration appropriate to perform a set of functions for configuration as the brake control system. At step 515, the alternate brake control system, i.e., the second (alternate) BCU 430 is activated in a different mode (i.e., temperature monitoring mode) as the brake temperature monitoring system.

In various embodiments, at step 505, if the determination is that the aircraft is not operating in the takeoff mode, the flow proceeds to step 520 and a determination is made as to whether the aircraft is in an approach or landing phase of flight operations. At step 525, once determined that operation of the aircraft is in the approach or landing phase, a determination is made as to whether the active brake control unit in the previous landing cycle was the first (primary) BCU 420. If it is determined that the active brake control system during the previous landing cycle was the first (primary) BCU 420, then at step 530 the second (alternate) BCU 430 is activated as the brake control system for the landing, and the previously activated primary system (operative in the previous landing cycle) is placed in a different mode (i.e., standby mode).

At step 525, if the determination is that the first (primary) BCU 420 was not active in the previous landing cycle, then at step 535 the first (primary) BCU 420 is activated as the brake control system for the approach (i.e., landing), and the second (alternate) BCU 430 is placed in a different mode (i.e., standby mode) and used only for brake temperature monitoring system. In this manner, both the primary and alternate braking control units alternate between performing brake functions in the approach phase to prevent a loss of function of a brake based on a single failure. This also enables the alternate brake control unit to perform the two functions of 1) acting as a standby module to relieve the primary braking system if there is a failure and also 2) providing the function of temperature monitoring of the brake operation without the need for a separate unit to perform temperature monitoring. Activating only one of the primary or alternate braking system as the active braking system prevents propagation of a failure mode between both the primary brake control unit and the alternate brake control unit, which could cause an un-commanded brake action to at least one wheel of the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 312(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A brake system, comprising:
   a primary brake control unit; and
   an alternate brake control unit;
   wherein, in response to the primary brake control unit being placed in an active mode, the primary brake control unit is configured to send data on a set of channels to control brake operation of at least one brake, while the alternate brake control unit is configured to receive data to monitor brake temperature on another, separate set of channels coupled to at least one brake temperature sensor associated with the at least one brake.

2. The brake system of claim 1, wherein the data on the set of channels to control brake operation and the data to monitor brake temperature are separately sent and received on different channels by the primary brake control unit and the alternate brake control unit.

3. The brake system of claim 1, wherein,
   in response to the alternate brake control unit being placed in the active mode, the alternate brake control unit is configured to send data on the set of channels to control brake operation of the at least one brake, while the alternate brake control unit is also configured to monitor brake temperature on the another, separate set of channels coupled to the at least one brake temperature sensor associated with the at least one brake.

4. The brake system of claim 1,
   Wherein, during takeoff of an aircraft, the primary brake control unit is configured to be in the active mode and to send data on the set of channels to the at least one brake, while the alternate brake control unit is configured to be in a standby mode to receive data separately on the another, separate set of channels to monitor temperature of the at least one brake during the takeoff of the aircraft.

5. The brake system of claim 4,
   Wherein, during landing of the aircraft, the alternate brake control unit is configured to be in the active mode and to send data on the set of channels to the at least one brake, and is also configured to receive data separately on the another, separate set of channels to monitor the temperature of the at least one brake during the landing of the aircraft.

6. The brake system of claim 5, wherein the primary brake control unit and the alternate brake control unit are configured to alternate between which is in the active mode for a plurality of aircraft operations to control the brake operation, with the alternate brake control unit being configured to monitor the brake temperature during the plurality of operations.

7. The brake system of claim 6, wherein the primary brake control unit is configured to function independent of the alternate brake control unit during the takeoff of the aircraft to prevent an un-commanded brake control action on at least one wheel of the aircraft during the takeoff and a loss of brake temperature monitoring on the at least one wheel of the aircraft during the takeoff.

8. A brake system, comprising:
   at least one inboard brake;
   at least one outboard brake;
   a plurality of brake temperature sensors associated with the at least one inboard brake and the at least one outboard brake;
   a primary brake control unit; and
   an alternate brake control unit;
   wherein the primary brake control unit is configured, in a first mode, to send data on a set of channels to control brake operation of the at least one outboard brake and at least one inboard brake, while the alternate brake control unit is configured, in a second mode, to receive data to monitor brake temperature on a different set of channels coupled to the plurality of brake temperature sensors associated with the at least one outboard brake and the at least one inboard brake.

9. The brake system of claim 8, wherein the data on the set of channels to control brake operation and the data to monitor brake temperature are sent and received on different sets of channels to segregate control and monitor functions between the primary brake control unit and the alternate brake control unit when controlling the brake operation and monitoring the brake temperature.

10. The brake system of claim 9, wherein the alternate brake control unit is configured, in the first mode, to send data on the set of channels to control brake operation of the at least one outboard brake and the at least one inboard brake and to monitor brake temperature on the different set of channels coupled to the plurality of brake temperature sensors associated with the at least one outboard brake and the at least one inboard brake.

11. The brake system of claim 9, wherein the primary brake control unit and the alternate brake control unit are configured vice versa in either the first mode or the second mode to send data on the set of channels to control brake operation of the at least one outboard brake and the at least one an inboard brake, while the alternate brake control unit is, in either the first mode or the second mode, configured to monitor brake temperature on the different set of channels coupled to the plurality of brake temperature sensors associated with the at least one outboard brake and the at least one inboard brake.

12. The brake system of claim 9, wherein the primary brake control unit is configured to be in the first mode for a takeoff flight phase to send data on the set of channels to the outboard brake and the inboard brake, while the alternate brake control unit is configured to be in the second mode in the takeoff flight phase to receive data separately on the different set of channels to monitor the temperature of at least the outboard brake and the inboard brake during the takeoff flight phase.

13. The brake system of claim 9, wherein the alternate brake control unit is configured to be in the first for a landing flight phase to send data on the set of channels to the outboard brake and the inboard brake, and to monitor the temperature of at least the outboard brake and the inboard brake during the landing flight phase.

14. The brake system of claim 13, wherein the primary brake control unit and the alternate brake control unit are configured to alternate between being in the first mode and the second mode for a plurality of aircraft operations to independently perform functions of controlling the brake operation, while the alternate brake control unit is configured for monitoring the brake temperature during the plurality of aircraft operations.

15. The brake system of claim 13, wherein the primary brake control unit is configured to function independent of the alternate brake control unit during multiple flight phases to control brake operation to prevent an un-commanded brake control action on at least one wheel of an aircraft during the multiple flight phases and to prevent loss of brake temperature monitoring on the at least one wheel of the aircraft during the multiple flight phases.

16. The brake system of claim 15, wherein the multiple flight phases comprise at least a taxi operation, a takeoff operation, and a landing operation of the aircraft.

17. A method of controlling a brake system, the method comprising:
setting a first status for a primary brake control unit;
setting a second status for an alternate brake control unit segregated from the primary brake control unit, wherein the second status is dependent on the first status;
determining whether the primary brake control unit, based on the first status, is configured in a state to perform functions of controlling brake operations;
determining whether the alternate brake control unit, based on the second status, is configured in the state to perform functions of controlling brake operations;
activating at least one of the primary brake control unit or the alternate brake control unit that is in the state to perform functions of controlling brake operations, as determined based on the first status and the second status, in order to segregate brake control operations; and
monitoring brake temperatures through the alternate brake control unit.

18. The method of claim 17, wherein segregating of the brake control operations prevents propagating of a failure mode between both the primary brake control unit and the alternate brake control unit that could result in an un-commanded brake control action on at least one wheel of an aircraft during a takeoff and loss of brake temperature monitoring on the at least one wheel of the aircraft during the takeoff.

19. The method of claim 17, wherein the first status comprises at least a takeoff status of the aircraft.

20. The method of claim 17, wherein the first status comprises at least a landing status of the aircraft.

* * * * *